United States Patent Office 2,744,129
Patented May 1, 1956

2,744,129

OMEGA HYDROXYALIPHATIC DIESTERS OF SULFONYL DIBENZOIC ACIDS

John R. Caldwell, Kingsport, Tenn., assignor to Eastman Kodak Company, Rochester, N. Y., a corporation of New Jersey No Drawing. Application October 3, 1952, Serial No. 313,071

1 Claim. (Cl. 260—470)

This application relates to omega-hydroxyaliphatic diesters of sulfonyl dibenzoic acids and their preparation as well as to certain valuable polyesters and the preparation of such polyesters.

It is an object of this invention to provide omega-hydroxy-alkyl and omega-hydroxyaliphatic ether glycols of p,p', m,m' and m,p'-sulfonyl dibenzoic acid and homologs of these acid isomers. It is a further object to provide a process for preparing these omega-hydroxyaliphatic diesters.

It is another object to provide a novel process for preparing polyesters by condensing one of these diesters with the same or a different omega-hydroxyaliphatic diester. It is a further object to provide novel polyesters which can be prepared by this process but excluding from this application those derived from p,p'-sulfonyl dibenzoic acid diesters. Other objects will become apparent hereinafter.

As pointed out in my application, Serial No. 143,594 (now U. S. Patent No. 2,614,120 dated October 14, 1952), of which this is a continuation-in-part, sulfonyl dibenzoic acids cannot be advantageously employed in preparing polyesters unless converted into esters thereof. The most advantageous esters are the β-hydroxyalkyl diesters which are described and claimed in my application 143,594 and are further covered by my concurrently filed application, Serial No. 313,070, as to their employment in preparing polyesters.

The lower alkyl diesters of sulfonyl dibenzoic acids are known in the prior art. They can be prepared by refluxing a sulfonyl dibenzoic acid with a large excess of an alcohol for a long period of time. Standard esterification procedures and catalysts can be employed. However, the alkyl diesters cannot be as advantageously employed in the preparation of polyesters as the β-hydroxyalkyl diesters or the omega-hydroxyaliphatic diesters.

In this specification the various isomers of sulfonyldibenzoic acid are referred to as the p,p'-, the m,m'- and m,p'- isomers wherein the positions are designated with relation to the sulfonyl group which is also considered as the group connected to the 1 and 1' positions on the two benzene rings attached thereto.

The novel diesters covered by this application are omega-hydroxyaliphatic diesters of a sulfonyl dibenzoic acid selected from the group consisting of those having the following general formulas:

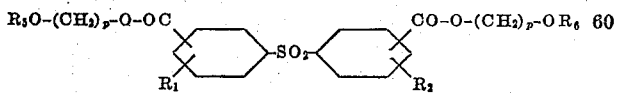

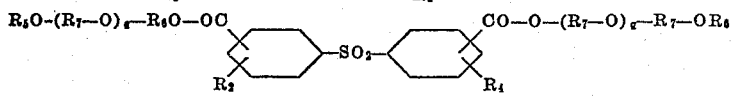

and

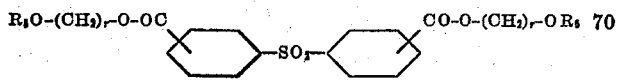

wherein $R_1$ and $R_2$ each represents an alkyl radical containing from 1 to 6 carbon atoms, $R_3$ and $R_4$ each represents a member of the group consisting of a hydrogen atom and an alkyl radical containing from 1 to 6 carbon atoms, $R_5$ and $R_6$ each represents a member of the group consisting of a hydrogen atom and an acyl radical containing from 2 to 4 carbon atoms, $R_7$ represents an alkylene radical containing from 2 to 4 carbon atoms, $p$ represents a positive integer of from 2 to 12, $q$ represents a positive integer of from 1 to 4 and $r$ represents a positive integer of from 3 to 12, each of the depicted —CO—O— substituents being positioned in a relationship to the —SO$_2$— substituent selected from those consisting of the meta and para positions, and each of the $R_1$, $R_2$, $R_3$ and $R_4$ substituents being positioned in a relationship to the —SO$_2$— substituent selected from those consisting of the ortho, meta and para positions not occupied by a —CO—O— substituent. The first and third of the above formulas represents hydroxyalkyl diesters and the second represents hydroxyaliphatic ether diesters.

According to one embodiment of this invention, a diester of a sulfonyl dibenzoic acid can be prepared by a preliminary process comprising condensing a dibenzoic compound of the group consisting of the various free sulfonyl-dibenzoic acids and akyl diesters thereof corresponding to the above formulas with a dioxy compound selected from those compounds having the following formulas:

and

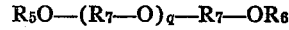

wherein $p$ represents a positive integer of from 3 to 12 inclusive, $q$ represents a positive integer of from 1 to 4 inclusive, $R_5$ and $R_6$ each represents a substituent selected from the group consisting of a hydrogen atom and an acyl radical containing from 2 to 4 carbon atoms and $R_7$ represents an alkylene radical containing from 2 to 4 carbon atoms, the dioxy compound being employed in such a proportion that there is at least an equivalent amount of $R_5O$— and —$OR_6$ substituents in proportion to the —CO—O— substituents in the overall combination of the dibenzoic compound and the dioxy compound, said condensation being conducted at an elevated temperature (such as that at which reflux conditions subsist however, higher and lower temperatures can also be employed) whereby members of the group consisting of alcohols and esters derived from $R_3$, $R_4$, $R_5$, and $R_6$ are removed from the condensation reaction mixture by distillation in an amount which is substantially molecularly equivalent to twice the amount of dibenzoic compound being condensed.

When the free acid is refluxed or otherwise heated with a dioxy compound according to this preliminary process, it is advantageous to employ an excess of the dioxy compound in unesterified form whereby there is from about 5 to about 12 times the amount of OH substituents in proportion to the —CO—OH substituents in the overall combination of the dibenzoic acid and the dioxy compound. The dioxy compounds which can be employed in accordance with this invention are most advantageously dihydroxy compounds; such compounds will hereinafter be referred to as dihydroxy compounds although it is to be understood that dioxy compounds of the type described above are intended to be covered by this term. When an ester of a sulfonyl dibenzoic acid is employed, it is advantageous to employ an excess of the dihydroxy compound whereby there is from about 1.2 to about 3 times the amount of $R_5O$— and —$OR_6$ substituents in proportion to the —CO—O substituents in the overall combination of the dibenzoic ester and the dihydroxy compound, and to carry out the ester interchange in the presence of a catalyst. Ester interchange catalysts are well known in the art; examples include the alkali metal alkoxides, e. g. sodium methoxide, etc. Any of the catalysts employed for as described below can be used. These are the catalysts which are effective in the polyesterification condensation; they are equally effective in this preliminary condensation.

The omega-hydroxyaliphatic diesters of a sulfonyl dibenzoic acid can be purified by recrystallization or by other standard purification procedures. If they are to be employed in preparing polyesters, no purification is necessary. The ester can be stored at any suitable temperature prior to polyesterification, if so desired, or it can be immediately self-condensed to form a polyester. Two or more of the omega-hydroxyaliphatic diesters can be formed simultaneously or they can be formed separately and intermixed. The admixture can then be employed in preparing a polyester.

A polyester can be prepared by a process comprising (A) condensing at least one omega-hydroxyaliphatic diester of a sulfonyl dibenzoic acid (prepared as described above), (B) with another such diester, and (C) in the presence of a condensing agent selected from the group consisting of the alkali metals, the alkaline earth metals, the alkoxides containing from 1 to 8 carbon atoms of these two groups of metals, the carbonates and borates of these two groups of metals, litharge, compounds of tin containing an R' substituent and compounds having the following formulas:

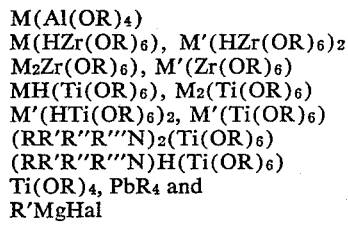

$M(Al(OR)_4)$
$M(HZr(OR)_6)$, $M'(HZr(OR)_6)_2$
$M_2Zr(OR)_6)$, $M'(Zr(OR)_6)$
$MH(Ti(OR)_6)$, $M_2(Ti(OR)_6)$
$M'(HTi(OR)_6)_2$, $M'(Ti(OR)_6)$
$(RR'R''R''')_2(Ti(OR)_6)$
$(RR'R''R''')H(Ti(OR)_6)$
$Ti(OR)_4$, $PbR_4$ and
$R'MgHal$ wherein M represents an alkali metal, M' represents an alkaline earth metal selected from the group consisting of magnesium, calcium and strontium, R represents an alkyl group containing from 1 to 6 carbon atoms, R', R" and R''' each represents a member of the group consisting of R and an aryl group of the benzene series containing from 6 to 9 carbon atoms and Hal represents a halogen atom, (D) at an elevated temperature, (E) the condensation being conducted in an inert atmosphere, and (F) the latter part of the condensation being conducted at a very low pressure of the inert atmosphere.

When a catalyst is employed in the preliminary process to facilitate ester interchange, no additional catalyst need necessarily be added when the polyesterification process is conducted; however, it may be advantageous in some instances to add a supplementary amount of catalyst or an additional different catalyst.

In the polyesterification process the elevated temperature employed during the earlier part of the condensation is advantageously from about 150° C. to about 220° C. However, higher and lower temperatures can also be employed. The upper temperature depends upon the boiling point of the dihydroxy compounds being distilled off. The low pressure defined under (F) is advantageously less than about 15 mm. of Hg pressure. Most advantageously the pressure is less than about 5 mm. of Hg pressure.

The properties of the above polyesters wherein the —CO—O— substituents are in para relationship to the —SO₂— substituent, and more detail as to how they can be prepared are set forth in my copending applications filed on even date herewith Serial Nos. 313,061–313,068, inclusive. The use of those of the above catalysts which are novel catalysts in preparing such linear polyesters are also covered in additional copending applications filed on even date herewith, Serial Nos. 313,072–313,078, inclusive; Serial Nos. 313,072–313,074 and 313,076–313,078 now U. S. Patents 2,720,502 to 2,720,507, inclusive.

As is apparent from the description of the process for the preparing of polyesters as set forth above, the preliminary process involving the preparation of the omega-hydroxyaliphatic diesters need not be immediately followed by the remainder of the steps described for the preparation of polyesters. These omega-hydroxyaliphatic diesters can be prepared in relatively pure form and stored at room temperatures until it becomes desirable to convert them into polyesters as described above.

The omega-hydroxyaliphatic diesters covered by this application can be depicted by the general formulas set forth above wherein $r$ is restricted to a positive integer of from 3 to 12 inclusive inasmuch as my application, Serial No. 143,594 claims the omega-hydroxyalkyl diesters wherein $p$ is 2 and there is no nuclear alkyl substituent.

Examples of omega-hydroxyalkyl diesters which come within the scope of this application include the γ-hydroxypropyl diester of p,p'-sulfonyl dibenzoic acid, the δ-hydroxybutyl diester of m,m'-sulfonyl dibenzoic acid, the zeta-hydroxyamyl diester of m,p'-sulfonyl dibenzoic acid, the theta-hydroxyhexyl diester of p,p'-sulfonyl dibenzoic acid, the β-hydroxyethyl diester of m,m'-diethyl-p,p'-sulfonyl dibenzoic acid, the β-hydroxyethyl diester of o,m'-dimethyl-p,p'-sulfonyl dibenzoic acid, the γ-hydroxypropyl diester of o,o'-dibutyl-p,p'-sulfonyl dibenzoic acid, the β-hydroxyethyl diester of p,p'-dimethyl-m,m'-sulfonyl dibenzoic acid, the β-hydroxyethyl diester of 6-methyl-2,4'-sulfonyl dibenzoic acid, the zeta-hydroxyhexyl diester of 6-methyl-3,4'-sulfonyl dibenzoic acid, etc.

Examples of omega-hydroxyaliphatic ether diesters include the hydroxyethoxyethyl diester of m,m'-sulfonyl dibenzoic acid, the hydroxypropoxypropyl diester of m,p'-sulfonyl dibenzoic acid, the hydroxyethoxyethyl diester of p,p'-sulfonyl dibenzoic acid, etc.

In the polyesterification process when linear highly polymeric polyesters are being prepared, it is important to exclude oxygen and moisture at all stages of the condensation, particularly during the latter stages thereof. An inert atmosphere is employed to exclude oxygen; such atmospheres include helium, hydrogen, nitrogen, etc. The reacting materials employed in the polyesterification condensation are advantageously substantially anhydrous; thus any water that may be initially present or which was formed during the preparation of the omega-hydroxyaliphatic diester is substantially completely removed prior to the completion of the preliminary process for preparing such a diester.

The dihydroxy compounds which can be employed to form the omega-hydroxyalkyl diesters are straight-chain alkanediols, viz. polymethylene glycols, wherein the hydroxy radicals are positioned at the two ends of the alkylene chain. Examples of such glycols include 1,3-propylene glycol, 1,4-butylene glycol, 1,6-hexylene glycol, 1,10-decamethylene glycol, 1,12-dodecamethylene glycol, etc. As indicated above, mono or diesters of these glycols can also be employed. Thus, the acetates, propionates and butyrates are examples of such esters. The defined ether glycols can be employed either in lieu of the polymethylene glycols or in conjunction therewith as modifiers. Examples of ether glycols include diethylene glycol, triethylene glycol, tetraethylene glycol, bis (4-hydroxybutyl) ether, bis (3-hydroxypropyl) ether, etc.

Valuable fibers can be advantageously prepared employing the higher melting polyesters which can be produced according to the procedures described herein. Preferably no diester derived from an aliphatic ether glycol is employed when fibers are to be prepared. Furthermore, the dibenzoic acid diesters should ordinarily contain the —CO—O— substituents connected only by p,p'-linkages when highly polymeric linear polyesters are desired. However, on the oter hand, valuable polyesters can be prepared employing diesters derived from aliphatic ether glycols without employing any diester derived from a polymethylene glycol although the product obtained will not generally be suitable for forming useful fibers. The same applies to the employment of diesters containing —CO—O— linkages in other than the para positions of the —SO₂— substituent. These fibers and their properties are described in my copending applications referred to above.

Polyesters derived solely from omega-hydroxyalkyl diesters of p,p'-sulfonyldibenzoic acid containing less than 5 carbon atoms in the alkyl radical melt above 300° C. and decompose at or near the melting point. For this reason they cannot be satisfactorily made by the process described herein and are excluded from this invention. In practice, it has been found desirable to employ such lower omega-hydroxyalkyl diesters in mixtures with other omega-hydroxyalkyl diesters containing at least 5 carbon atoms or with omega-hydroxyaliphatic ether glycols (see my copending application, Serial No. 313,067 filed on even date herewith) to give polyesters than can be handled at temperatures below about 300° C.

The catalytic condensing agents which can be employed have been described above. From about 0.005% to about 0.2% of such catalysts based on the weight of the sulfonyl dibenzoic compounds being condensed can be employed in both the preliminary process and in the polyesterification process. Higher or lower percentages can also be employed. Generally, from about 0.01% to about 0.06% of the catalytic condensing agent can be advantageously employed.

The temperature at which polyesterification can be conducted is dependent upon the specific reactants involved in any given reaction. In general, the reaction mixture can be heated with agitation as from about 150° to about 220° C. for from approximately one to three hours in an enert atmosphere (e. g. nitrogen or hydrogen); the mixture can then be heated with agitation at from about 225°–240° to about 280°–310° C. in the same atmosphere for approximately 1 to 2 hours. Finally, the pressure can be greatly reduced to form a vacuum (less than about 15 mm. of Hg pressure but preferably on the order of less than 5 mm. of Hg pressure) while the temperature is maintained in the same range (225°–310° C.); these conditions are advantageously maintained for approximately 1 to 6 additional hours. This final phase is advantageously carried out with good agitation under the high vacuum in order to facilitate the escape of volatile products from the highly viscous melt. The conditions can be varied considerably depending upon the degree of polyesterification desired, the ultimate properties sought, the stability of the polyester being produced, and the use for which the product is intended. The employment of the novel catalytic condensing agents results in better products being prepared in much less time than is possible when the catalysts of the prior art are employed. The reaction can be carried out in the presence or absence of a solvent. Inert, high boiling compounds, such as diphenyl ether, diphenyl, mixed tolyl sulfones, chlorinated naphthalene, chlorinated diphenyl, dimethyl sulfolane, etc., can be used as the reaction medium.

The omega-hydroxyaliphatic diesters can also be employed in processes for preparing polyesters as described above wherein a part of the described omega-hydroxyaliphatic diester of a sulfonyl dibenzoic acid having the formula set forth above is replaced with an ester of a replacement acid which can be aliphatic dibasic acid, e. g. carbonic acid, oxalic acid, succinic acid, adipic acid, sebacic acid, α,α-dimethyl-glutaric acid, dimethylmalonic acid, diglycollic acid, β-oxydipropionic acid, γ-oxydibutyric acid, maleic acid, fumaric acid, itaconic acid, etc. Similarly, other esterified acidic modifiers can also be employed in partial replacement of the diesters of a sulfonyl dibenzoic acid or they can be employed in conjunction with one or more of the described replacement acid esters, e. g. linoleic acid esters, linolenic acid esters, and other related fatty acids in their esterified form (such as soybean, cottonseed, tung and other vegetable oil fatty acids).

The polyesterification process described above for the general practice of this invention in preparing polyesters need not be appreciably modified when such partial replacement acid esters are employed in conjunction with the sulfonyl dibenzoic diesters, except when they are unsaturated and tend to form insoluble and infusible products due to cross-linkage effects, in which event the process described hereinabove is advantageously terminated at an intermediate temperature of about 250° C. before the pressure is reduced whereby products are obtained which can be called soluble intermediate polyesters and which are useful in preparing protective coatings. The various polyesters containing replacement acid esters as described in this paragraph can be prepared according to procedures similar to those described in copending applications filed on even date herewith by J. R. Caldwell, Serial Nos. 313,062–313,066 and 313,068, inclusive.

Polyesters can also be prepared employing the defined omega-hydroxyaliphatic diesters of a sulfonyl dibenzoic acid in conjunction with other hydroxyaliphatic diesters of such acids which can be formed by reacting an alkyl diester of a sulfonyl dibenzoic acid or the free acid with a polyhydroxy compound which contains 3 or more hydroxy radicals, e. g. glycerol, sorbitol, pentaerythritol, dipentaerythritol, β-methylglycerol, 2-methyl-2-hydroxymethyl - 1,3 - propanediol, 1,2,4 - trihydroxybutane, etc. Acyl derivatives of these polyhydroxy compounds can also be employed. In the preparation of polyesters employing such polyhydroxyalkyl diesters, the reaction mixture is not generally heated to the high temperatures under reduced pressure as described hereinabove since the product would become insoluble and infusible due to cross-linkage of the molecules; hence, the process is halted at about 250° C. or less prior to the reduction in the pressure of the inert atmosphere. Various solutions can then be prepared from these soluble polyester products which can then be cast into films or otherwise used in protective coating compositions. The various polyesters prepared from the polyhydroxyalkyl diesters employed in conjunction with the omega-hydroxyaliphatic diesters as described in this paragraph and the method for their preparation are similar to that set forth in a copending application filed on even date herewith by J. R. Caldwell, Serial No. 313,069.

The useful polyester products which can be produced according to the process of the instant application and which are not covered specifically by other related copending applications possess favorable flow characteristics over a temperature differential or range of about 5° to 20° C. or more and contain in the polyester configuration a repeating unit selected from those having one of the following general formulas:

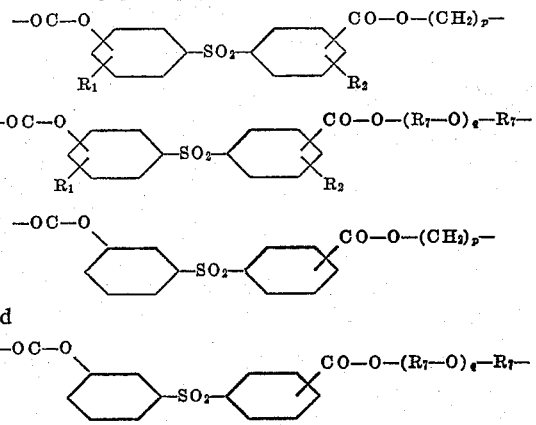

and wherein $p$ represents an integer of from 2 to 12, $q$ represents an integer of from 1 to 4, $R_1$ and $R_2$ each reprents an alkyl radical containing from 1 to 6 carbon atoms and the positions of $R_1$, $R_2$ and the disconnected —CO—C substituents are defined above (note that in the last two formulas the position of the —OC—O— substituents on the left are connected in meta relationship to the —SO$_2$— group).

It has been found that the polyesters of this invention as defined above have valuable uses in instances where a high melting point is not a requirement. These new polyesters can be prepared having a relatively wide softening range and good flow characteristics whereby they are quite valuable for the production of shaped objects by injection molding or extrusion methods. These novel polyesters can be prepared so as to soften at temperatures up to about 160° C. Useful fibers can be prepared from the polyesters softening at the higher temperatures. The polyesters which soften at lower temperatures can be employed in preparing molded objects, sheets, film, etc. The lowest melting polyesters can be employed in preparing varnishes, lacquers, etc. All of these polyesters can be prepared in admixture with or subsequently admixed with other resinous materials including the polyesters described in my copending applications filed on even date herewith, especially the p,p'-sulfonyl dibenzoic acid polyesters.

Two of the outstanding characteristics of the polyesters of this invention are their contribution to excellent dimensional stability and low degree of water absorptivity. This results in superior resistance to dimensional change despite changes in atmospheric humidity or immersion in aqueous solutions.

The melting point of the polyester products of this invention depend upon the chain length of the dihydroxy compound from which the omega-hydroxyaliphatic diester is derived. For example, when a polyester is prepared from an omega-hydroxyalkyl diester derived from a glycol containing more than 4 carbon atoms the melting temperature is in the room temperature range or slightly higher. When alkyl homologs are employed they are advantageously those of p,p'-sulfonyl dibenzoic acid, e. g. m,m'-dimethyl-p,p'-sulfonyl dibenzoic acid, o-ethyl-p,p'-sulfonyl dibenzoic acid, m-methyl-o-propyl-p,p'-sulfonyl dibenzoic acid, etc. Most advantageously the polyesters are those derived from omega-hydroxyalkyl diesters to the practical exclusion of those derived from omega-hydroxyaliphatic ether diesters.

In the examples given below, the hot bar sticking temperature is referred to in several instances. The hot bar sticking test can be briefly described as follows: A polyester fiber is placed on the flat surface of a heated bar and a weight of 100 grams is applied to the fiber along a distance of ⅝ inch of the fiber length. The contact surface of this weight has a coating of polytetrafluoroethylene which acts as a thermal insulator. The fiber is allowed to remain in contact with the bar under this weight for one minute. The minimum temperature at which the fiber adheres to the hot bar under these conditions is the sticking temperature as that term is employed in the examples given herein.

This invention can be further illustrated by the following examples; in addition to these examples it is apparent that other variations and modifications thereof can be adapted to obtain similar results.

*Example 1.—The β-hydroxyethyl diester of 6-methyl-3,4'-sulfonyl dibenzoic acid*

348 g. (1 mol) of the methyl ester of 6-methyl-3,4'-sulfonyl dibenzoic acid and 124 g. (2 mols) of ethylene glycol were placed in a reaction vessel equipped with a stirrer and a short distillation column. Magnesium metal chips (0.2 g.) were activated by heating at 100° C. with iodine crystals and were added to the mixture as a catalyst. The reaction mixture was then heated and stirred at 190°–200° C. for two hours whereby methyl alcohol was distilled off resulting in the formation of the β-hydroxyethyl diester of 6-methyl-3,4'-sulfonyl dibenzoic acid.

*Example 2.—Polyester from diester of Example 1*

The diester prepared in Example 1 was heated to a temperature of 230°–240° C. in the apparatus described in Example 1. An atmosphere of pure nitrogen was maintained over the reaction mixture which was kept well stirred. This temperature was held for 30 minutes following which the pressure of the inert atmosphere was reduced to 1–2 mm. of Hg pressure and heating was continued at the same temperature for an additional 5–6 hours. The polyester product which was obtained has an inherent viscosity of 0.6–0.7 in a solution containing 60% phenol and 40% sym. tetrachlorethane. This polyester can be converted into fibers, sheets, rods, etc., by extrusion methods. It softens at 100–110° C.

*Example 3.—The β-hydroxyethyl diester of 6-methyl-4,4'-sulfonyl dibenzoic acid*

One mole of the methyl ester of 6-methyl-4,4'-sulfonyl dibenzoic acid was reacted with two mols, of ethylene glycol in the same apparatus according to the same procedure as described in Example 1 whereby the β-hydroxyethyl diester was formed.

*Example 4.—Polyester from diester of Example 3*

The diester prepared in Example 3 was heated to a temperature of 230°–240° C. in the apparatus according to the procedure set forth in Example 2 whereby the diester was converted into a polyester which can be employed to prepare fibers that can be drafted 400–600%. These fibers have a sticking temperature of 130–140° C. This polyester is also useful as a molding plastic. It can be converted into films, sheets, rods, tubes, etc.

*Example 5.—The β-hydroxyethyl diester of 6,6'-dimethyl-3,3'-sulfonyl dibenzoic acid*

362 g. (1 mol.) of the methyl ester of 6,6'-dimethyl-3,3'-sulfonyl dibenzoic acid and 124 g. (2 mols.) of ethylene glycol were placed in a reaction vessel as described in Example 1. A solution of 0.3 g. of sodium titanium ethoxide in 10 cc. of ethyl alcohol was added as a catalyst. The reaction mixture was heated and stirred at 190–200° C. for two hours whereby methyl alcohol was distilled off and the β-hydroxyethyl diester was formed.

*Example 6.—Polyester from diester of Example 5*

The diester prepared according to Example 5 was heated to a temperature of 230–240° C. in a nitrogen atmosphere and held for 30 minutes. The pressure of the inert atmosphere was then reduced to 1–2 mm. of Hg pressure and the condensation was continued at the same temperature for 5–6 hours. A polyester was obtained which has an inherent viscosity of 0.7–0.8 in a 60% phenol–40% tetrachlorethane solution. This polyester can be converted into fibers, films and molded objects that soften at 100–110° C.

*Example 7.—The β-hydroxyethyl diester of 2,2'-dimethyl-4,4'-sulfonyl dibenzoic acid*

One mol. of the methyl ester of 2,2'-dimethyl-4,4'-sulfonyl dibenzoic acid was heated with two moles of ethylene glycol in the same apparatus as described in Example 1 employing the procedure set forth in Example 5 whereby the β-hydroxyethyl diester was formed.

*Example 8.—Polyester from diester of Example 7*

The diester prepared in Example 7 was condensed to produce a polyester product which can be employed to prepare molded and extruded objects that soften at 150–160° C. The condensation was conducted in the same manner as described in Example 6.

*Example 9.—The delta-hydroxybutyl diester of 2,2'-dimethyl-4,4'-sulfonyl dibenzoic acid*

One mol. of the methyl ester of 2,2'-dimethyl-4,4'-sulfonyl dibenzoic acid and two mols. of tetramethylene glycol were placed in a reaction vessel as described in Example 1. A solution of 0.3 g. of sodium titanium ethoxide in 10 cc. of ethyl alcohol was added as a catalyst. This mixture was heated according to the procedure set forth in Example 5 whereby methyl alcohol was distilled off and the delta-hydroxybutyl diester was formed.

*Example 10.—Polyester from diester of Example 9*

The diester prepared in Example 9 was condensed according to the procedure set forth in Example 6 whereby a polyester product was obtained which can be employed to prepare molded and extruded objects that soften at 120–130° C.

*Example 11.—The zeta-hydroxyhexyl diester of 6-methyl-3,4'-sulfonyl dibenzoic acid*

348 g. (1 mol.) of the methyl ester of 6-methyl-3,4'-sulfonyl dibenzoic acid and two mols. of hexamethylene glycol were placed in a reaction vessel equipped with a stirrer, a short distillation column, and an inlet for purified nitrogen. Magnesium metal chips (0.2 g.) were activated by heating at 100° C. with iodine crystals and were added as a catalyst. The reaction mixture was heated and stirred in about 200° C. for two hours whereby methyl alcohol distilled off resulting in the formation of the zeta-hydroxyhexyl diester.

*Example 12.—Polyester from diester of Example 11*

The diester prepared in Example 11 was polyesterified by heating with agitation at a temperature of 230–240° C. in a nitrogen atmosphere where it was held for 30 minutes following which the pressure was then reduced to 1 to 2 mm. of Hg pressure and heating was continued for an additional 5 to 6 hours. The polyester product obtained softens at about 40–50° C. This polyester can be employed as a constituent of varnishes, lacquers, and other protective coatings.

*Example 13.—Polyester incorporating the β-hydroxyethyl diester of 3,3'-sulfonyl dibenzoic acid*

Two mols of m,m'-sulfonyl dibenzoic acid β-hydroxyethyl ester (prepared in the same manner as that described above) and 1 mol. of p,p'-sulfonyl dibenzoic acid β-hydroxyethyl ester (see my parent application for preparation) were heated with magnesium catalyst (0.2 g. of Mg activated by heating with iodine). The equipment employed was the same as in Example 2. An inert atmosphere of purified nitrogen was employed. The reaction mixture was heated at about 225° C. with stirring while ethylene glycol distilled off. The temperature was then raised to 260–275° C. over a period of two hours and held in this range for another hour. The pressure was then reduced to about 0.8–1.0 mm. of Hg pressure and heating was continued for five more hours. The polyester obtained is useful as a molding plastic and for preparing films.

*Example 14.—Polyester from 3,4'-sulfonyl dibenzoic acid*

Three hundred and ninety-four grams (1.0 mol) of m,p'-sulfonyl dibenzoic acid β-hydroxyethyl ester (see parent application for preparation) were placed in a reaction vessel equipped with a stirrer. Magnesium turnings (0.2 g.) activated by heating with iodine were added as catalyst. The vessel was heated at 220–230° C. and the stirrer was started. An inert atmosphere of purified nitrogen was employed. Ethylene glycol began to distill as the ester interchange took place. The temperature was raised to 260–270° C. during 2 hours and held at this temperature for 1 hour. A vacuum for 1 mm. was applied for 5 hours. The product obtained is useful as a molding plastic.

*Example 15.—The hydroxyethoxyethyl diester of 6-methyl-4,4'-sulfonyl dibenzoic acid*

One gram mole of 6-methyl-4,4'-sulfonyl dibenzoic acid and 10 gram moles of diethylene glycol were condensed in apparatus as described in Example 1. The reaction mixture was heated to the boiling point and these conditions maintained until approximately 2 gram moles of acetic acid has distilled off. The product was a solution in diethylene glycol of the hydroxyethoxyethyl diester of 6-methyl-4,4'-sulfonyl dibenzoic acid which can then be purified by recrystallization or employed directly in the preparation of polyesters in a manner which is the same as that described above.

*Example 16.—The delta-hydroxybutyl diester of p,p'-sulfonyl dibenzoic acid*

One gram mole of the methyl diester of p,p'-sulfonyl dibenzoic acid and 8.0 gram moles of butylene glycol were placed in a reaction vessel equipped with a stirrer and a short distillation column. Sodium methoxide (0.2 gram) was added as an ester interchange catalyst. The reaction mixture was then heated at the boiling point for three hours whereby approximately 2 gram moles of methyl alcohol distilled off. The product was then purified by evaporating off the excess glycol and recrystallizing from solution in ethyl alcohol. The delta-hydroxybutyl diester of p,p'-sulfonyl dibenzoic acid obtained has a melting point of 121°–123° C. It can be employed in the preparation of polyester in the manner described in the preceding examples.

*Example 17.—The epsilon-hydroxyamyl diester of p,p'-sulfonyl dibenzoic acid*

One gram mole of the ethyl diester of p,p'-sulfonyl dibenzoic acid and 7.5 gram moles of pentamethylene glycol were placed in a reaction vessel equipped with a stirrer and a short distillation column. Potassium methoxide (0.2 gram) was added as an ester interchange catalyst. The reaction mixture was then heated at the boiling point for three hours whereby approximately 2 gram moles of ethyl alcohol distilled off. The product was then purified by evaporating off the excess glycol and recrystallizing from solution in methyl alcohol. The epsilon-hydroxyamyl diester of p,p'-sulfonyl dibenzoic acid obtained has a melting point of 162°–164° C. It can be employed in the preparation of polyesters in the manner described in the preceding examples.

*Example 18.—The zeta-hydroxyhexyl diester of p,p'-sulfonyl dibenzoic acid*

One gram mole of the propyl diester of p,p'-sulfonyl dibenzoic acid and 10.0 gram moles of hexamethylene glycol were placed in a reaction vessel equipped with a stirrer and a short distillation column. Lithium aluminum methoxide (0.2 gram) was added as an ester interchange catalyst. The reaction mixture was then heated at the boiling point for three hours whereby approximately 2 gram moles of propyl alcohol distilled off. The product was then purified by evaporating off the excess glycol and recrystallizing from solution in acetic acid. The zetahydroxyhexyl diester of p,p'-sulfonyl dibenzoic acid obtained has a melting point of 156°–157° C. It can be employed in the preparation of polyesters in the manner described in the preceding examples.

*Example 19.—The 10-hydroxydecyl diester of p,p'-sulfonyl dibenzoic acid*

One gram mole of the methyl diester of p,p'-sulfonyl dibenzoic acid and 3.0 gram moles of decamethylene glycol were placed in a reaction vessel equipped with a stirrer and a short distillation column. Sodium aluminum methoxide (0.2 gram) was added as an ester interchange catalyst. The reaction mixture was then heated at the boiling point for three hours whereby approximately 2 gram moles of methyl alcohol distilled off. The product was then purified by evaporating off the excess glycol and recrystallizing from solution in ethyl alcohol. The 10-hydroxydecyl diester of p,p'-sulfonyl dibenzoic acid obtained can be employed in the preparation of polyesters in the manner described in the preceding examples.

I claim:

The hydroxyethoxyethyl diester of 6-methyl-4,4'-sulfonyldibenzoic acid having the following formula:

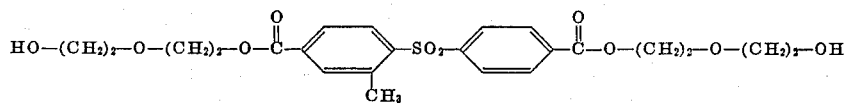

References Cited in the file of this patent

UNITED STATES PATENTS

| | | |
|---|---|---|
| 2,465,319 | Whinfield et al. | Mar. 22, 1949 |
| 2,534,028 | Izard | Dec. 12, 1950 |
| 2,614,120 | Caldwell | Oct. 14, 1952 |

OTHER REFERENCES

Chem. Abst., "Naming and Indexing of Chem. Comp.," Dec. 20, 1945, pgs. 5914, 5916, 5918, vol. 39.